United States Patent  (10) Patent No.: US 12,138,792 B2
Prajapati et al.  (45) Date of Patent: Nov. 12, 2024

(54) DYNAMIC MESSAGING SYSTEM FOR FACTORY AUTOMATION DEVICE

(71) Applicant: FANUC AMERICA CORPORATION, Rochester Hills, MI (US)

(72) Inventors: Ashok Prajapati, Rochester Hills, MI (US); Rick Wunderlich, Canton, MI (US); Kenneth Krause, Rochester Hills, MI (US); Isaac Eckert, Grand Blanc, MI (US); Isaac Robinson Stephan Thangaiah Albert, Rochester Hills, MI (US); Eric Flanagin, Ortonville, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 1046 days.

(21) Appl. No.: 16/809,307

(22) Filed: Mar. 4, 2020

(65) Prior Publication Data

US 2021/0276181 A1    Sep. 9, 2021

(51) Int. Cl.
*B25J 9/16* (2006.01)
*G05B 19/418* (2006.01)

(52) U.S. Cl.
CPC .............. *B25J 9/163* (2013.01); *B25J 9/1669* (2013.01); *G05B 19/4185* (2013.01); *G05B 2219/31368* (2013.01); *G05B 2219/31455* (2013.01)

(58) Field of Classification Search
CPC ........ B25J 9/1602; B25J 9/1669; B25J 9/163; G05B 19/4185; G05B 2219/31101;
(Continued)

(56) References Cited

U.S. PATENT DOCUMENTS 5,131,092 A    7/1992  Sackmann et al.
5,987,035 A *  11/1999 Silva ................. H04Q 3/54583
                                                              370/467

(Continued)

FOREIGN PATENT DOCUMENTS

JP      2014050951 A1    3/2014

*Primary Examiner* — Stephen Holwerda
(74) *Attorney, Agent, or Firm* — John A. Miller; Shumaker, Loop & Kendrick, LLP

(57) ABSTRACT

A dynamic messaging system for factory automation devices that provides flexible data transport, presentation and scheduling. Custom message instructions are provided to robot controllers using configuration templates which are loadable without rebooting the controller or affecting ongoing operations of the robot. The configuration templates contain data definitions only and no executable code. Custom data messages are sent from the robot controller based on triggers, including periodic timers, transmission of a current message, change of device elements and programmatic requests. Custom message attributes such as transmission rate and priority can be set, and messages may include file attachments. A message template creator, external to the robot controller, creates the configuration templates, ensures message uniqueness and generates data ingestion schema. The schema are used by a cloud data parser to translate and load data into data tables, where the customer can analyze data from the messages using applications in a web portal.

20 Claims, 4 Drawing Sheets

(58) Field of Classification Search
CPC .... G05B 2219/31368; G05B 2219/31455; Y02P 90/80; Y02P 90/02
See application file for complete search history.

(56) References Cited

U.S. PATENT DOCUMENTS

| | | | |
|---|---|---|---|
| 6,115,646 | A | 9/2000 | Fiszman et al. |
| 6,470,227 | B1 | 10/2002 | Rangachari et al. |
| 7,676,279 | B2 | 3/2010 | Hood et al. |
| 8,782,249 | B1 * | 7/2014 | Hood ............... H04L 69/08 709/227 |
| 2006/0074498 | A1 * | 4/2006 | Kalan ............... G06Q 10/10 700/19 |
| 2007/0233283 | A1 * | 10/2007 | Chen ............... G05B 19/4185 700/17 |
| 2008/0065243 | A1 | 3/2008 | Fallman et al. |
| 2010/0082132 | A1 | 4/2010 | Marruchella et al. |
| 2011/0060427 | A1 * | 3/2011 | Batke ............... H04L 43/12 700/79 |
| 2011/0072382 | A1 | 3/2011 | Caldwell et al. |
| 2014/0074286 | A1 * | 3/2014 | Geheb ............... B25J 9/1674 700/245 |
| 2015/0045955 | A1 | 2/2015 | Hashiguchi et al. |

* cited by examiner

DYNAMIC MESSAGING SYSTEM FOR FACTORY AUTOMATION DEVICE

FIELD OF THE INVENTION

This invention relates generally to a dynamic messaging system for factory automation devices. More particularly, the present disclosure describes a method and system for providing dynamically-created messages from industrial robots and other factory automation devices that provides flexible message content and message format, and allows a variety of triggers to be defined for sending the dynamic message.

BACKGROUND OF THE INVENTION

This section provides background information related to the present disclosure which is not necessarily prior art.

Factory automation devices, particularly industrial robots, are used extensively in many factories. These devices reliably and repeatably perform tasks such as material movement, cutting, welding, fastening, etc. In order to continue performing these tasks with the required accuracy, the robots must be maintained in peak operating condition. When joints begin to wear or electronic devices such as position encoders begin to degrade, preventive maintenance must be performed. In order to determine the condition of the robots and evaluate the need for maintenance, data from robot sensors must be periodically evaluated.

There are also other reasons that data from robot sensors may be needed, aside from diagnosing the need for preventive maintenance. The robot manufacturer, or the customer who has installed the robot, may want to receive data about robot activity—such as total or average weight of material moved, total length of welds performed, maximum angular velocity or acceleration in joints, images of parts which have been handled or rejected, etc. Furthermore, the needed output data may not be known when the robot is put into production. Thus, there is a need for the robot controller to allow the flexible definition of new data output messages.

Some existing robot controllers allow data output messages to be defined. However, the definition of a new data output message in existing controllers requires the controller to be re-programmed and rebooted. This not only interrupts ongoing operations of the robot, but also introduces the opportunity for programming mistakes which could adversely impact production uptime and quality.

In view of the circumstances described above, there is a need for a method of configuring a robot controller with messaging instructions which does not require re-programming or rebooting the controller, where the messaging instructions cause the robot controller to send dynamically-defined and triggered data messages to a receiving user or system.

SUMMARY

The present disclosure describes a dynamic messaging system for factory automation devices that provides flexible data transport, presentation and scheduling. Dynamic message instructions are provided to a robot controller using configuration templates which can be loaded without rebooting the controller or affecting ongoing operations of the robot. The configuration templates contain data definitions only and no executable code. Dynamic messages are sent from the robot controller based on triggers, including periodic timers, transmission of a pre-programmed message, change of device elements and programmatic requests. Dynamic message attributes such as transmission rate and priority can be set, and messages may include file attachments. A message template creator, external to the robot controller, creates the configuration templates, ensures message uniqueness and generates data ingestion schema. The schema are used by a cloud data parser to translate and load data into data tables, where the customer can analyze data from the messages using applications in a web portal.

Additional features of the present disclosure will become apparent from the following description and appended claims, taken in conjunction with the accompanying drawings.

DETAILED DESCRIPTION OF THE EMBODIMENTS

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
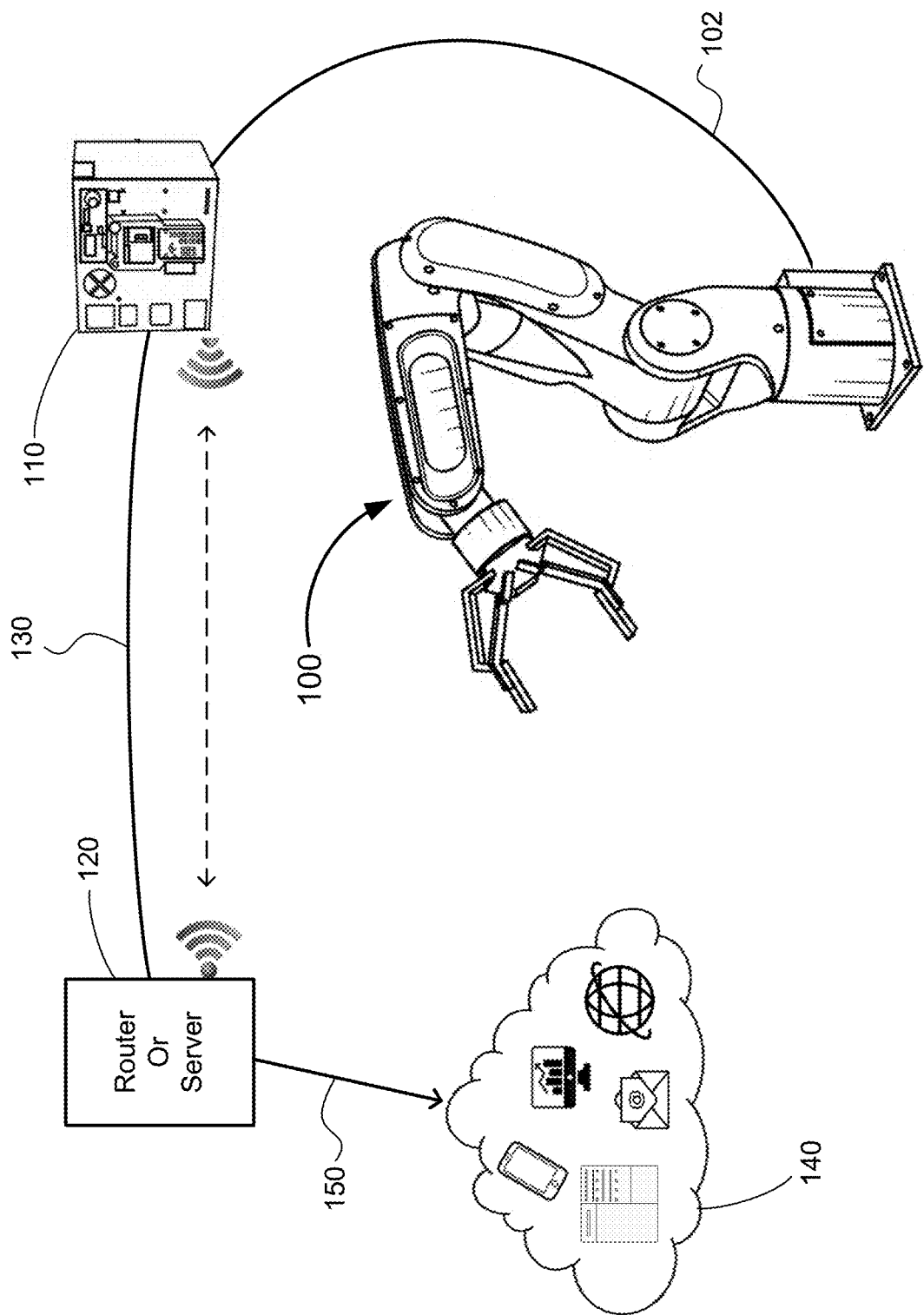
FIG. 1 is an illustration of a factory automation device or industrial robot, with associated robot controller and network connectivity, according to an embodiment of the present disclosure.

FIG. 1 is an illustration of a factory automation device or industrial robot 100, with associated robot controller 110, according to an embodiment of the present disclosure. The robot 100 may be any type of industrial robot known in the art, including robots capable of material movement, cutting, welding, assembly, painting, etc. The robot communicates with the robot controller 110 over a communication line 102 as would be understood by one skilled in the art. That is, the controller 110 provides movement and task commands to the robot 100 based on pre-defined programming, and the controller 110 receives sensor data back from the robot 100 indicating joint positions and velocities, forces and torques, tool status, and other data as appropriate.

It is also known for the controller 110 to communicate with a router or server 120 such that the controller 110 can provide data about the operation of the robot 100 for downstream applications. The router or server 120 is typically located in the same factory or facility as the robot 100, but may be remote, and the communication may be over a hard-wire connection 130, or may be wireless. It is known for robot controllers such as the controller 110 to send pre-programmed messages to a destination device or user, typically via the router or server 120.

The dynamic messaging system of the present disclosure may be used on any suitable factory automation device. Although FIG. 1 shows the factory automation device being the typical 6-axis robot 100, the factory automation device may be any suitable robot, computer numerical control (CNC) machine (lathe, mill, etc.), a data collector, or other device with a controller capable of configuration as discussed below. For the sake of simplicity, the factory automation device will generally be referred to simply as an industrial robot (the robot 100) in the following discussion.

Although it is known for the robot controller 110 to communicate with another device such as the router or server 120, the present disclosure provides new capabilities for flexible message definition, including sending data messages to "the cloud" 140—which represents any location, device or user accessible via hypertext transport protocol (HTTP), an Internet Protocol (IP) address, a short message service (SMS) text message, an email address, etc. The router or server 120 communicates with the cloud 140 via a communication link 150, which may be a standard broadband Internet connection. The robot controller 110 could alternatively be configured to directly communicate with the cloud 140, with no need for the router or server 120. The data messages may also be loaded onto a physical device such as a USB drive (not shown).

The disclosed dynamic messaging system enables factory automation devices to send messages to web servers, phones via text, emails servers, etc. The flexible nature of the service allows users to configure transport types, message formats, and user defined message types dynamically. Following is a brief overview discussion of the disclosed method and system.

The present disclosure describes a dynamic messaging system for factory automation devices such as the robot 100. This system provides flexible data transport, presentation and scheduling. It can send diagnostic and production data to any network device or destination in the cloud 140 or a local file device per user choice. Custom data configuration of data messages, from a locally-attached computer or a web interface, is available through this service. The configuration process does not impact the running production of the robot 100 and does not make any programmatic changes to risk the production. It automatically piggybacks the custom data to existing data blocks, or sends standalone data blocks or triggers with change events. The dynamic messaging system is capable of sending a variety of data formats, such as ASCII, image, binary, etc. Data can be presented to the user at any network destination, on handheld devices, web interfaces and texts, and on locally-attached file devices like USB, memory cards, etc. through this service.

The dynamic messaging system is useful for communicating variable changes in the robot 100. Variable change monitoring consists of monitoring data blocks on the robot controller 110 and advising the user what change has occurred. These blocks can be variables (system or user), registers and/or digital I/O. Using the disclosed dynamic messaging system, new messages can be configured and loaded to the robot controller 110 without having to shut down, re-boot or reprogram the controller 110. This capability provides significant benefit over prior systems which require messages to be defined in controller programming.

Similarly, user-created programs running on the controller 110 may be monitored for any changes in variables, item status, internal messages, etc. Each change is flagged as soon as it happens along with the new and old value to see the differences, and notification of the change is sent to the user via the dynamic messaging system. Frequency of notification is configurable and can be controlled during the run time through a configuration template.

Figure 2:
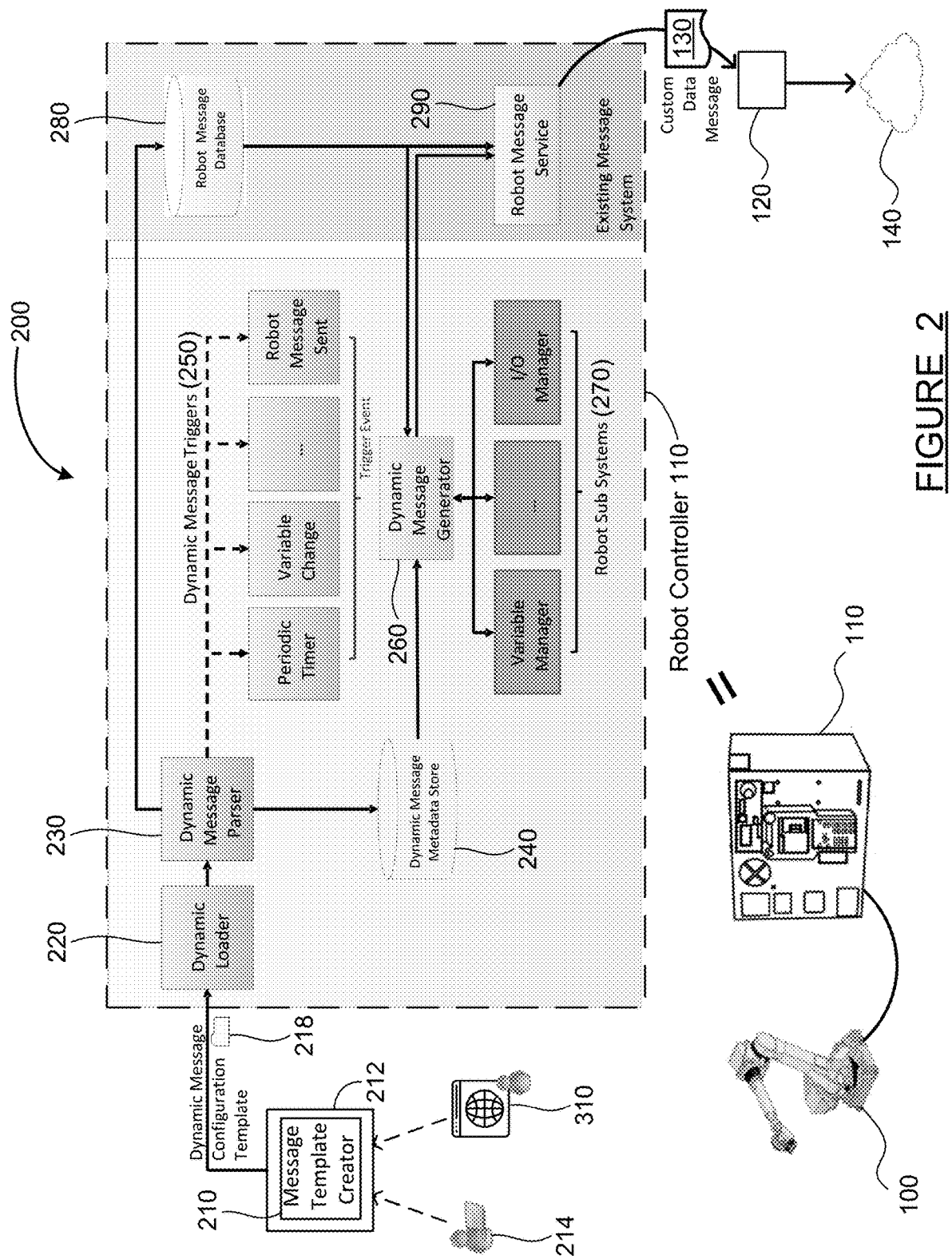
FIG. 2 is block diagram illustration of a dynamic messaging system for factory automation devices, including details of message creation inside a robot controller, according to an embodiment of the present disclosure.

FIG. 2 is block diagram illustration of a dynamic messaging system 200 for factory automation devices, including details of message creation inside a robot controller, according to an embodiment of the present disclosure. The robot controller 110 is shown graphically at the bottom, connected to the robot 100 as in FIG. 1. The robot controller 110 is also shown schematically (in block diagram form) in the center of the page, including everything inside the large dashed rectangle.

A message template creator module 210 runs on a computer or server 212 other than the controller 110. In one embodiment, discussed further below, the message template creator module 210 is accessed via a web portal. The message template creator module 210 is accessed by a local user 214 who may have direct or local area network access to the computer 212, or accessed by a user from a web portal 310 (discussed later). The user is the person who wants to define a new dynamic message configuration template, and the message template creator module 210 is the software which is used to create the configuration template. A dynamic message configuration template 218 is provided to the controller 110 using any form of file transfer, such as via hard-wired or wireless local area network, physical portable media device, etc.

The message template creator module 210 allows the user to create the configuration template 218 which defines the following for a new dynamic message; what data or content to include in the message, what trigger(s) will cause the message to be sent, what sending priority the message will have, and the message format. The message template creator module 210 also creates endpoint ingestion schemes—that is, defines how the device which receives the message will intake the dynamic data, based on the defined data content, format, file attachments, etc. The data ingestion is also discussed further below.

The data or content to include in the message may include anything from a wide array of data and files available on the controller 110. This includes kinematics/dynamics data such as joint angular position, velocity and acceleration, along with joint loads. Data about the tool or end effector on the outer arm of the robot 100 may also be included—such as grasper force, paint sprayer on-time, welding laser on-time or length, etc. Some robots include a vision system for tracking parts or the position of another tool. Where a vision system camera is available, camera image files may be included as content in the dynamic message. Data and variables from any user-defined programs running (in the Karel programming language) on the controller 110 are also available to include in the dynamic messages. Furthermore, any files resident in the controller 110 may be included as attachments in the dynamic messages—including diagnostic files, log files, image files, data files, etc. All of the data and content items mentioned here are available to select in the message template creator module 210.

Several different types of triggers may be defined in the configuration template 218, where the triggers, when detected, cause the dynamic message to be created and sent by the controller 110. One type of trigger is a periodic timer—where the user can designate the dynamic message to be sent every four hours, once per day, once per week, etc. Another type of trigger is detection of a change in a variable or data value. Just as different variables and data values (any parameter understood to the controller 110) can be included in the dynamic message, so these variables and data values can be monitored to trigger message sending. For example, a value of joint force exceeding a certain limit, or a total linear welding distance exceeding a threshold, may be cause for triggering a message.

As mentioned earlier, it is known for the robot controller 110 to be pre-programmed to send messages, such as daily log file messages, error report messages, etc. A trigger may also be defined which causes a dynamic message to be sent in response to the sending of one of the pre-programmed messages. For example, a dynamic message may be defined to send additional data/files/images when a particular error report message is sent, thus improving the diagnosis of the error. The parameters and values of interest may not be known when the robot 100 is initially programmed and put into production. With the disclosed dynamic messaging system, the triggering and sending of any data of interest can be added without re-booting or reprogramming the controller 110.

Other information contained in the configuration template 218 includes message sending priority and message format. Sending priority indicates whether the dynamic message will be sent immediately, or deferred to send at a later time, and also indicates a transmission rate. Message format designates how the message will appear to the recipient, which could be simple ASCII text or numbers, binary data, HTML (web page definition), etc.

When the user has completed the configuration template 218 using the message template creator module 210, the template 218 is provided to the robot controller 110 via any suitable file transfer mechanism. A dynamic loader module 220 (in the controller 110) receives the template 218. This step, and the following steps, may be performed while the controller 110 is running and controlling the robot 100 in normal production operations, because the configuration template 218 includes only data and no programming. The loader module 220 provides the template 218 to a dynamic message parser 230.

The parser 230 parses information out of the configuration template 218 and performs several actions as a result. The parser 230 creates a new message shell in a robot message database 280, which is an existing database containing the pre-programmed messages discussed earlier. The message shell in the message database 280 is essentially a template of a message, which will be filled out with the appropriate data later. The parser also creates a record in a dynamic message metadata store 240. The metadata store 240 records the metadata associated with the message shell in the database 280. In other words, the entry in the metadata store 240 designates what data values, files, etc. need to be added when the dynamic message is created and sent. More than one dynamic message may be configured for the robot controller 110, and each particular dynamic message has an identifier which uniquely identifies the dynamic message shell in the database 280 and the record in the metadata store 240.

The parser 230 also creates one or more message triggers 250 for each particular dynamic message. As discussed earlier, the triggers 250 may include periodic timers, detection of a change of the value of a variable or register, detection of the sending of a particular pre-programmed robot message (such as an error message), etc. The triggers 250 are established by the parser 230 and then monitored in real time during execution of the operating system of the controller 110.

When a trigger event occurs and is detected by the controller 110, a dynamic message generator module 260 is invoked. The generator module 260 is informed that a trigger has been encountered for a particular dynamic message, such as a message identified as number "9876". The generator module 260 then retrieves the message shell for the message number 9876 from the message database 280. The generator module 260 also retrieves the metadata record for the message number 9876 from the metadata store 240. The generator module 260 then accesses existing robot sub-systems 270 to collect the data designated by the metadata record. For example, the generator module 260 may access a variable manager, an input/output (I/O) manager, a file manager, or other databases or memory registers of the controller 110. The content of the dynamic message (files, data values, etc.—as discussed earlier) is retrieved from the sub-systems 270 and plugged into the message shell from the message database 280, according to the metadata record from the metadata store 240. At this point, the dynamic message 9876 is complete and ready to send.

The message generator module 260 provides the created dynamic message to an existing robot message service 290, which is used to send messages from the controller 110 to the pre-determined destination. The particular robot 100 and controller 110 typically have a single pre-determined message destination, which is used for pre-programmed messages, and is also used for the dynamic messages of the present disclosure. As discussed earlier, the destination may be any cloud-based or network-based device or user, or a local file transfer device. The destination device may have received an ingestion scheme template from the computer 212, as discussed earlier.

From the robot message service 290, the controller 110 sends a custom data message 130 to the local router or server 120, where it is sent out to the cloud 140. The message may also be provided to a local storage device instead of the cloud 140, as discussed earlier.

The dynamic messaging system of the present disclosure essentially provides an extremely flexible and configurable data collector for the robot 100. Any system-accessible variable or file can be included in one of the dynamic message templates, and designated for sending based on a selectable trigger event. All of this data collection can be configured without cycling power or reprogramming the controller 110.

The configuration template 218 is a standard file recognized by the controller 110. A single configuration template 218 may be created using the message creator module 210 and provided to multiple robot controllers 110, so that the same dynamic message instructions are loaded on multiple robots—for example, all identically-configured painting robots in a vehicle spray paint booth.

Figure 3:
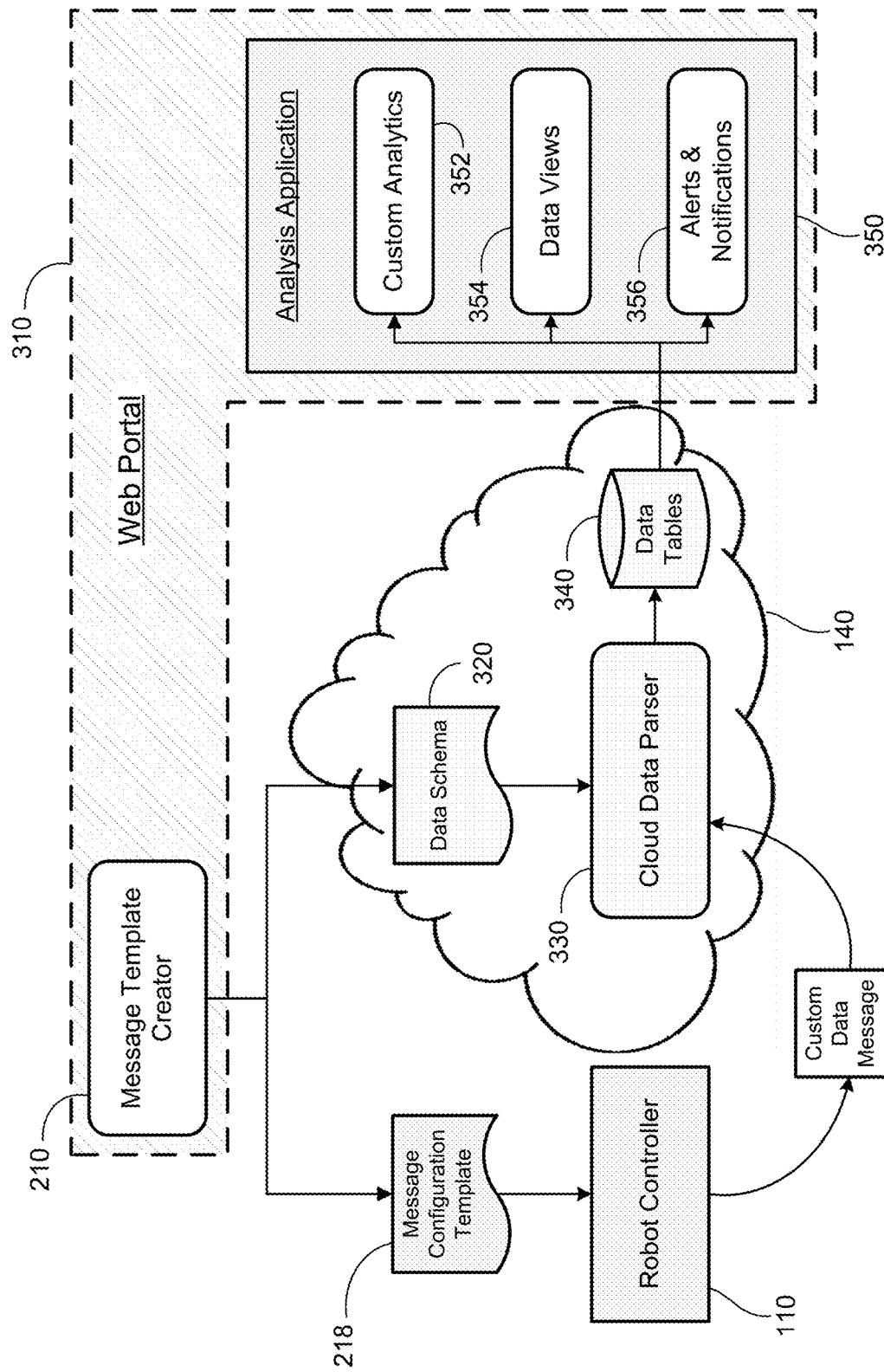
FIG. 3 is block diagram illustration of a dynamic messaging system for factory automation devices, including data flow from start to finish, according to an embodiment of the present disclosure.

FIG. 3 is block diagram illustration of a dynamic messaging system for factory automation devices, including data flow from start to finish, according to an embodiment of the present disclosure. Whereas FIG. 2 focused on the data message creation operations within the robot controller 110, FIG. 3 shows the entire process from the customer's standpoint—from the creation of the message template, through message creation by the robot controller 110, to data message processing in the cloud, and finally to data analysis by the customer.

The customer begins by using the message template creator module 210, shown in FIG. 2 and discussed previously, to define what data or content to include in the message, what trigger(s) will cause the message to be sent, what sending priority the message will have, and the message format. In the preferred embodiment shown in FIG. 3, the message template creator module 210 is part of a web portal 310, which is a web-based application hosted by the robot manufacturer and available to robot customers. In addition to the message details mentioned above, the customer also designates which robot controllers will receive the message configuration template 218 (also shown on FIG. 2). The customer can choose to load the message configuration template 218 on any individual robot controller 110, or on multiple controllers—such as the controllers of all robots in a particular customer facility (factory), or on the controllers of all robots of a particular model at all of the customer's facilities, etc.

When message template creation is complete, the customer sends the message configuration template 218 from the message template creator module 210 to the robot controller 110 of the one or more designated robots. The robot controller(s) 110 then load and process the message configuration template 218 as discussed above with respect to FIG. 2, sending the custom data message 130 when a trigger is encountered. When message template creation is complete, the message template creator module 210 also creates a data schema 320 corresponding to the template 218, where the data schema 320 defines the data fields which will be included in the data message, and the structure and data types for each field. The data schema 320 is sent to a cloud data parser 330, which is a routine hosted by the robot manufacturer in the cloud 140.

The robot controller(s) 110 load and parse the message configuration template 218. As discussed previously, no reboot or power cycling of the controller 110 is required in order to process the template. The robot controller 110 then awaits the one or more triggers 250 and, when a trigger is experienced, sends the custom data message 130. If the message configuration template 218 is installed on more than one robot controller 110, the controllers 110 may trigger message sending at different times.

The custom data message 130 is sent from the robot controller(s) 110 to the cloud data parser 330 in the cloud 140. The actions of receiving and storing custom data by the cloud data parser 330 are referred to as "data ingestion"—which essentially includes extraction, translation, and loading, where the data schema 320 is applied to the skeletal XML data in the custom data message 130 to make it structured for efficient storage, display and analysis. While the XML in the custom data message 130 from the robot controller 110 does have structure, it does not carry enough information with it to interpret the data field values, types and formats. The data schema 320 includes the structure and data types for the data fields in the custom data message 130, allowing the parser 330 to read the XML message, apply the schema 320 to the XML, and store the formatted and structured data in data tables 340.

Again, both the data schema 320 and the message configuration template 218 are derived from the same message definition/configuration by the user. When defining/configuring the custom message, the user includes a list of fields he/she wishes to include, and this message definition information is stored in the message template creator module 210 of the web portal 310. The message template creator module 210 then generates both the message configuration template 218 for loading onto the robot controller 110, as well as the data schema 320 that the parser 330 will apply to the incoming data message 130.

The cloud data parser 330 may temporarily queue up incoming data messages for aggregate processing. The cloud data parser 330 may then ingest a single message, or may ingest multiple messages of a type at one time. Regardless, all of the data from all of the messages will ultimately end up in the data tables 340.

The data stored in the data tables 340 from the ingestion of data messages by the cloud data parser 330 grow over time as more messages are ingested. The data in the data tables 340 are fully defined with all attributes to support any type of analysis and reporting that the customer may wish to perform—such as analyzing robot joint data for an individual robot over a period of time spanning multiple data messages (to look for changes or upward trends), or analyzing robot joint data for all robots performing a particular type of operation in a factory (to look for outliers from the norm).

The web portal 310 also includes an analysis application 350, used by the robot customer to view and analyze the data in the data tables 340 which were provided in the custom data messages 130. The analysis application 350 includes a custom analytics module 352 for performing any mathematical or statistical analysis of the data desired by the customer, a data views module 354 for views and reports of the data, and an alerts & notifications module 356 where alerts and notifications can be configured as desired by the customer—such as when an individual or average data value falls outside a prescribed normal range, or when a trend line for a data field indicates that the parameter may soon fall outside the range.

The modules of the analysis application 350 have access to all of the data in the data tables 340. A customer ID number identifies data in the data tables 340 such that a user of a particular customer only has access to that particular customer's data. With each data record being identified with date/time and robot controller identity, the customer has complete flexibility to view and analyze the data in any way they wish in order to understand the performance of their robots and anticipate any maintenance that may be needed.

As the customer views and analyzes data using the analysis application 350 in the web portal 310, the customer will likely identify other parameters that they want to monitor, and can easily configure other custom data messages using the message template creator 210 in the web portal 310.

In one embodiment, the cloud data parser 330 and the data tables 340 are hosted by a server computer which also hosts the web portal 310, including the message template creator module 210 and the analysis application 350. Other types of distributed computing and cloud computing configurations are also possible, as would be understood by those skilled in the art.

Figure 4:
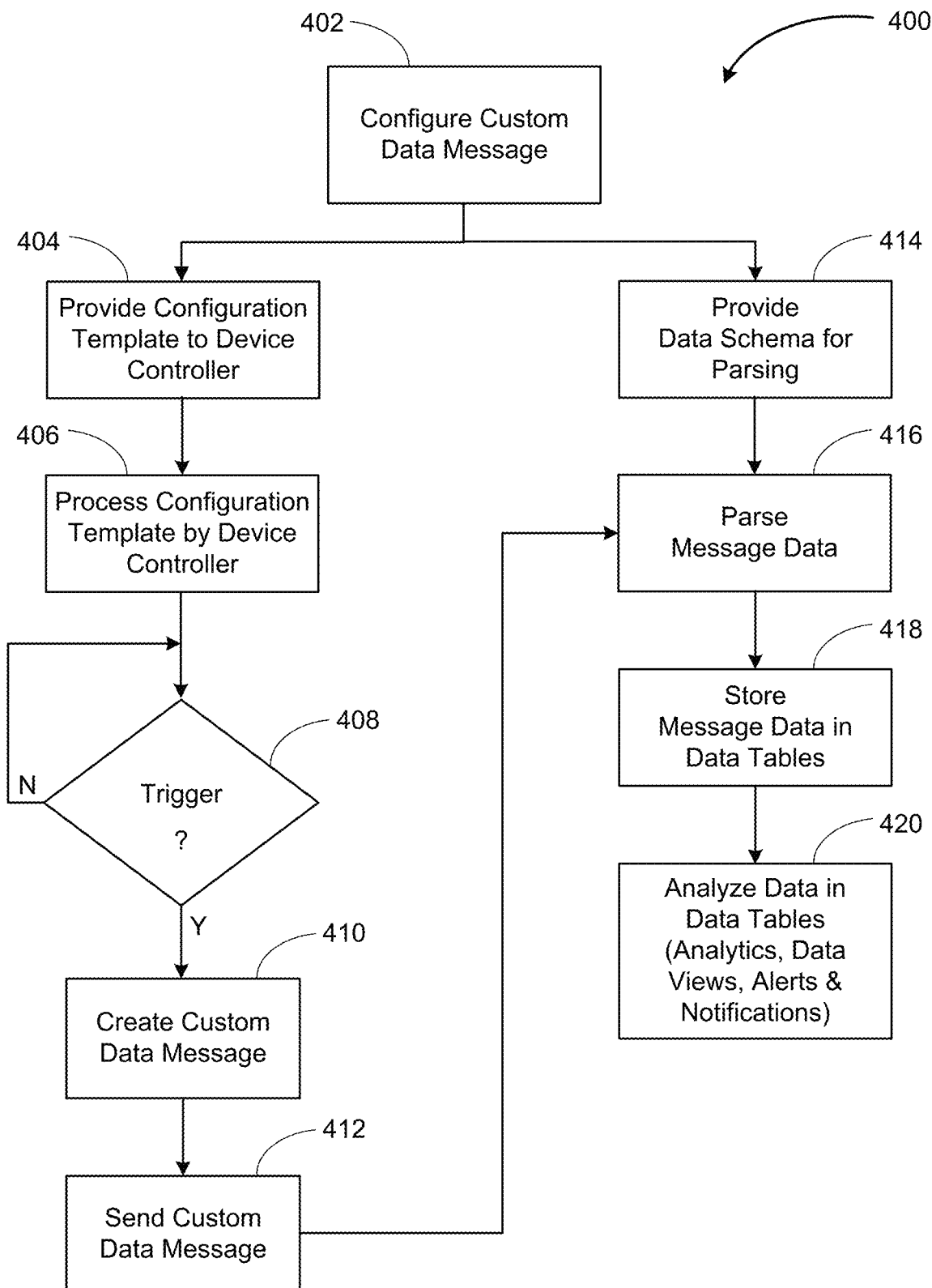
FIG. 4 is a flowchart diagram of a method for dynamic messaging for factory automation devices, according to an embodiment of the present disclosure.

FIG. 4 is a flowchart diagram 400 of a method for dynamic messaging for factory automation devices, according to an embodiment of the present disclosure. At box 402, the message configuration template 218 is created using the message template creator module 210. The message template creator module 210 runs on a computer which is separate from the robot controller 110, such as the computer 212. The message template creator module 210 is preferably accessed by a user of the web portal 310. The message template creator module 210 also creates, at box 414, the data schema 320 for data ingestion by the data parser 330 when the parser 330 receives custom data messages.

Once created, the dynamic message configuration template 218 is provided to the robot controller 110 at box 404. This file transfer may be performed via a local area or wide area network connection, or by physically transferring the template file 218 on a portable storage device. In a preferred embodiment, the message configuration template 218 is transferred from the web portal 310 to the one or more robot controllers 110 which are targeted for the particular message. At box 406, the configuration template 218 is parsed and processed by the controller 110. Processing the configuration template 218 includes creating the uniquely-identified dynamic message shell in the message database 280, creating a corresponding message metadata record in the metadata store 240, and establishing corresponding message triggers 250.

At decision diamond 408, the controller 110 monitors for the occurrence of one of the triggers 250. When one of the triggers 250 is encountered, the custom data message 130 is created at box 410. This includes retrieving the message shell (corresponding with the trigger) from the message database 280, retrieving the metadata record from the metadata store 240, and collecting data and files from the robot sub-systems 270 as indicated in the metadata record.

After creating the custom data message 130 at the box 410, the controller 110 sends the custom data message 130 at box 412 using the existing robot message service module 290. The custom data message 130 is sent to the cloud data parser 330, or a local storage device, as discussed previously. At box 416, in a preferred embodiment, the cloud data parser 330 parses the message data from one or more of the custom data messages 130. The cloud data parser 330 previously received the data schema 320 at the box 414, where the schema 320 contain the content and format of the XML data in the messages 130, enabling the parser 330 to extract and translate the data.

At box 418, the data in the one or more custom data messages 130 are stored in the data tables 340, as discussed previously. At box 420, the customer user analyzes the data in the data tables 340 using the analysis application 350 in the web portal 310. This includes data viewing and reporting, data analysis, and establishing alerts and notifications based on data values and trends.

Multiple dynamic messages may be configured on the controller 110 (for example, one dynamic message which sends images for rejected parts, another dynamic message which sends joint load data when a threshold load value is exceeded, etc.), and one dynamic message configuration template 218 may be provided to multiple robot controllers 110 so that all such controllers 110 operate with the same dynamic messaging instructions.

To summarize, the dynamic messaging system discussed above provides numerous features and advantages over prior messaging systems. Dynamic messaging instructions are loaded on the controller 110 without affecting production operation of the robot 100. The configuration template 218, which contains only data and no executable code, enables the robot 100 to push data dynamically to any destination. The dynamic message can be configured to include any system-accessible parameter or file, and can be sent based on triggers such as a periodic timer, a change in a data register or other element, or the sending of a pre-programmed robot message. Extendible message formats are available, such as XML, JSON and binary. Dynamic message format, transmission rate and priority are also customizable through the configuration template 218. The message template creator module 210 allows users to configure the message content and triggers as described above, creates the configuration template 218 and ensures message uniqueness.

As will be well understood by those skilled in the art, the several and various steps and processes discussed herein to describe the disclosed methods may be referring to operations performed by a computer, a processor or other electronic calculating device that manipulate and/or transform data using electrical phenomenon. In particular, this refers to the robot controller 110 and the computer 212 which runs the message template creator module 210. Those processors and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media. Further, the robot controller 110 is understood to be in communication with the computer 212, and to have Internet connectivity, so that the controller 110 can send the dynamic messages to any cloud-based destination.

The disclosed methods for dynamic messaging from factory automation devices provide a means for flexibly defining messages to be sent from industrial robots, without shutting down, re-booting or reprogramming the robot. This capability enables customers to analyze robot performance in ways which were not envisioned when the robot was first programmed and put into production, resulting in improved robot performance and uptime.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for dynamic messaging for factory automation devices, said method comprising:
    defining a message configuration template, using a message template creator module running on a computer, where the message configuration template defines properties of a custom data message including message content, one or more message sending triggers, message priority and message format;
    providing the message configuration template to a controller of a factory automation device, said controller having a processor and memory;
    processing the message configuration template by the controller;
    creating the custom data message, by the controller, when one of the message sending triggers is experienced, where the custom data message includes the message content and the message format designated in the message configuration template; and
    sending the custom data message from the controller to a message destination, where the custom data message is sent with the message priority designated in the message configuration template.

2. The method according to claim 1 wherein processing the message configuration template by the controller includes processing the template during normal operations of the controller and the factory automation device without shutting down, restarting or reprogramming the controller.

3. The method according to claim 1 wherein processing the message configuration template by the controller includes creating a uniquely-identified message shell in a message database, creating a corresponding message metadata record in a metadata store, and establishing the one or more message sending triggers for monitoring.

4. The method according to claim 3 wherein creating the custom data message includes retrieving the message shell which corresponds to the message sending trigger which was experienced, retrieving the corresponding message metadata record, and collecting the message content according to the message metadata record.

5. The method according to claim 4 wherein collecting the message content includes collecting the message content from robot sub-systems including a file manager, a variable manager and an input/output manager.

6. The method according to claim 1 wherein the message content includes one or more of data files, image files, diagnostic files, log files and parameter data.

7. The method according to claim 6 wherein the parameter data includes one or more of joint load data, joint kinematics data, end effector performance data, and user-defined program variable data.

8. The method according to claim 1 wherein the message sending triggers include a periodic timer, a variable change and sending of a pre-programmed robot message.

9. The method according to claim 1 further comprising providing the message configuration template to controllers of additional factory automation devices, where the controllers of the additional factory automation devices create and send the custom data message when one of the message sending triggers is experienced.

10. The method according to claim 1 wherein the message destination is an Internet Protocol (IP) address, a hypertext transport protocol (HTTP) address, an email address, a short message service (SMS) address or number, or a locally-attached storage device.

11. The method according to claim 1 wherein the message destination is a cloud data parser which parses the custom data message using a data schema provided by the message template creator module, and the cloud data parser loads data in the custom data message into data tables accessible by a customer web portal for analysis of the data.

12. The method according to claim 1 wherein the factory automation device is a multi-axis industrial robot.

13. A method for dynamic messaging for industrial robots, said method comprising:
defining a message configuration template, by a customer using a message template creator module running in a web portal application on a server, where the message configuration template defines properties of a custom data message including message content and message format;
creating a data schema defining the properties of the custom data message including the message content and the message format;
providing the message configuration template to a controller of an industrial robot, said controller having a processor and memory and being in communication with the industrial robot;
processing the message configuration template by the controller, including processing the template during normal operations of the controller and the industrial robot without shutting down, restarting or reprogramming the controller;
creating the custom data message, by the controller, when a message sending trigger is experienced, where the custom data message includes the message content and the message format designated in the message configuration template;
sending the custom data message from the controller to a data parser;
parsing the custom data message by the data parser using the data schema;
loading data from the custom data message into data tables by the data parser; and
analyzing the data in the data tables, by the customer using data analysis and viewing modules running in the web portal application.

14. A dynamic messaging system for a factory automation device, said system comprising:
a server computer running a message template creator module, the message template creator module being programmed for a user to access via a web portal to define a message configuration template, where the message configuration template defines properties of a custom data message including message content, one or more message sending triggers, and message format;
a factory automation device; and
a controller in communication with the factory automation device and the server computer, said controller having a processor and memory, said controller being configured to:
receive the message configuration template from the server computer;
process the message configuration template during normal operations of the controller and the factory automation device, without rebooting the controller;
create the custom data message when one of the message sending triggers is experienced, where the custom data message includes the message content designated in the message configuration template; and
send the custom data message from the controller to the server computer,
where the server computer also runs a cloud data parser, said cloud data parser being configured to parse the custom data message using a data schema provided by the message template creator module, and store data from the custom data message in data tables,
and where the server computer also runs an analysis application accessible by the user via the web portal to analyze the data in the data tables.

15. The system according to claim 14 wherein processing the message configuration template by the controller includes creating a uniquely-identified dynamic message shell in a message database, creating a corresponding message metadata record in a metadata store, and establishing the one or more message sending triggers for monitoring.

16. The system according to claim 15 wherein creating the custom data message includes retrieving the dynamic message shell which corresponds to the message sending trigger which was experienced, retrieving the corresponding message metadata record, and collecting the message content according to the message metadata record.

17. The system according to claim 16 wherein collecting the message content includes collecting the message content from robot sub-systems including a file manager, a variable manager and an input/output manager, and where the message content includes one or more of data files, image files, diagnostic files, log files and parameter data, and where the parameter data includes one or more of joint load data, joint kinematics data, end effector performance data, and user-defined program variable data.

18. The system according to claim 14 wherein the analysis application includes a mathematical and statistical analysis module, a data viewing and reporting module, and an alerts and notifications module.

19. The system according to claim 14 wherein the message sending triggers include a periodic timer, a variable change and sending of a pre-programmed robot message.

20. The system according to claim 14 wherein the factory automation device is a multi-axis industrial robot.

* * * * *